CAMSHAFT FOR INTERNAL COMBUSTION ENGINE VALVE GEAR

Original Filed May 3, 1965 9 Sheets-Sheet 1

LOADED AND DEFLECTED CAMSHAFT

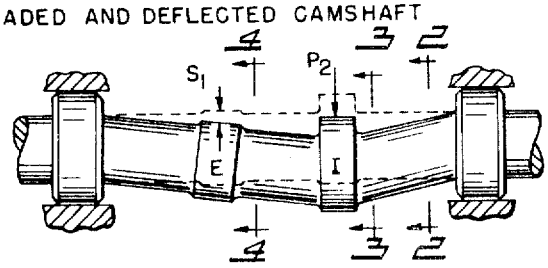

$P_2$ = VALVE SPRING LOAD ON INTAKE CAM
$S_1$ = DEFLECTION OF SHAFT AT EXHAUST CAM

Fig. 1

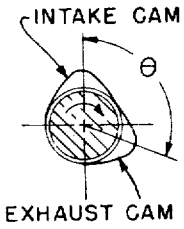

Fig. 2

THE PROBLEM

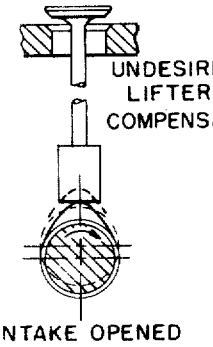

Fig. 3

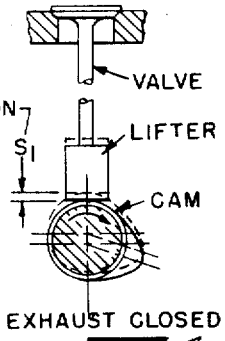

Fig. 4

Fig. 5

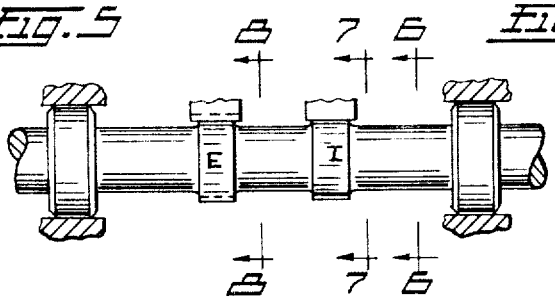

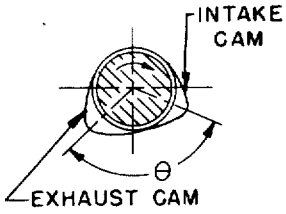

Fig. 6

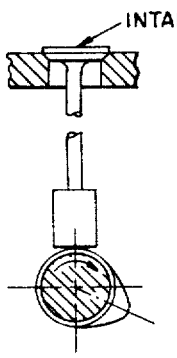

INTAKE VALVE SEATED PROPERLY AFTER DEFLECTION IS REMOVED.

Fig. 7

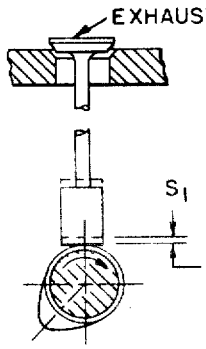

LIFTER COMPENSATED BECAUSE OF EARLIER DEFLECTION AFTER CAMSHAFT DEFLECTION IS REMOVED.

EXHAUST VALVE SLIGHTLY OPENED BECAUSE OF LIFTER COMPENSATION-VALVE SHOULD BE CLOSED.

Fig. 8

INVENTOR
MICHAEL C. TURKISH
BY Schramm, Kramer & Sturgis
ATTORNEYS

Feb. 20, 1968 M. C. TURKISH Re. 26,353

CAMSHAFT FOR INTERNAL COMBUSTION ENGINE VALVE GEAR

Original Filed May 3, 1965 9 Sheets-Sheet

THE INVENTION

Fig. 9

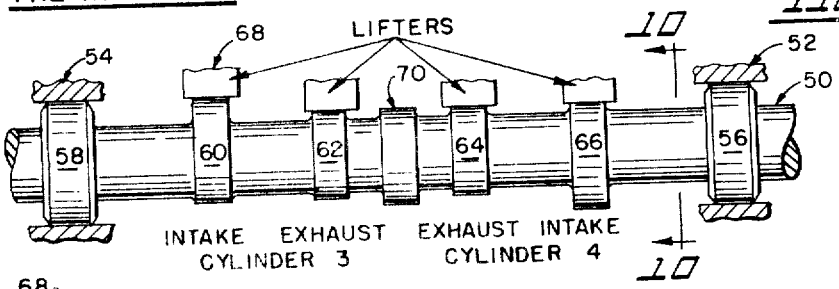

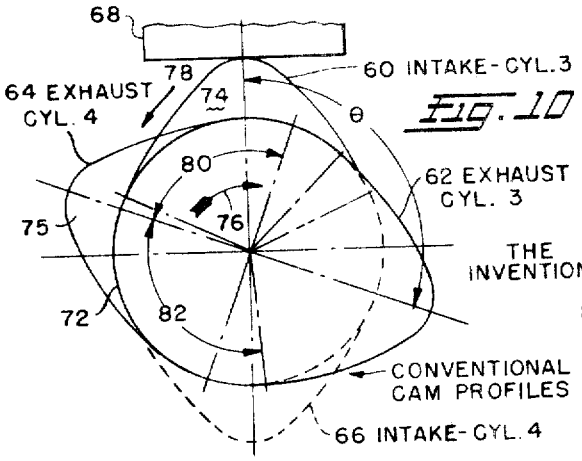

Fig. 10

Fig. 12

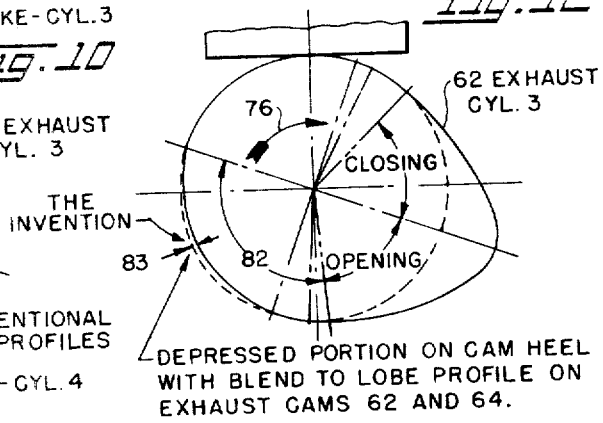

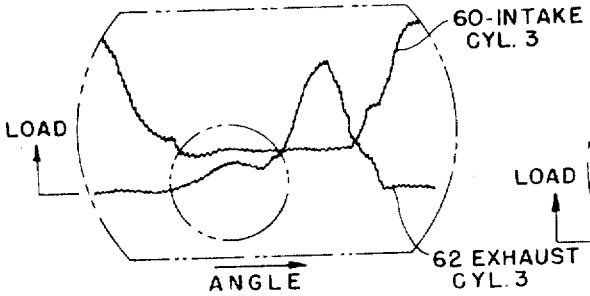

REPRODUCTION OF ACTUAL OSCILLOGRAM SHOWING PRESENCE OF EXHAUST VALVE FORCING ON CAM BASE CIRCLE.

Fig. 11

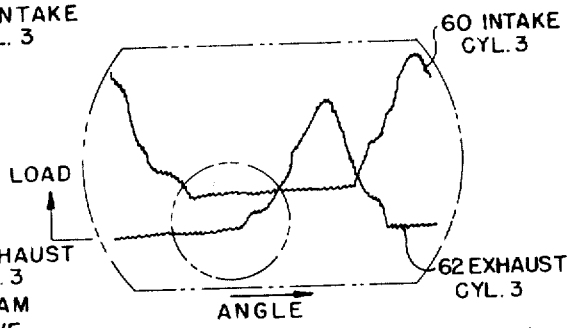

REPRODUCTION OF ACTUAL OSCILLOGRAM SHOWING ABSENCE OF EXHAUST VALVE FORCING BY CAM HEEL.

Fig. 13

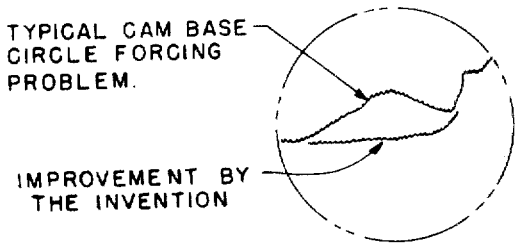

COMPOSITE OSCILLOGRAM ILLUSTRATING IMPROVEMENT DUE TO THE INVENTION.

Fig. 14

INVENTOR
MICHAEL C. TURKISH

BY Schramm, Kramer & Sturgis
ATTORNEYS

CAMSHAFT FOR INTERNAL COMBUSTION ENGINE VALVE GEAR

Original Filed May 3, 1965 9 Sheets-Sheet 3

INVENTOR.
MICHAEL C. TURKISH
BY
Schramm, Kramer & Strage
ATTORNEYS

INVENTOR.
MICHAEL C. TURKISH
BY
Schramm, Kramer & Sturgis
ATTORNEYS

CAMSHAFT FOR INTERNAL COMBUSTION ENGINE VALVE GEAR

Original Filed May 3, 1965 9 Sheets-Sheet 5

INVENTOR.
MICHAEL C. TURKISH
BY
Schramm, Kramer & Stinger
ATTORNEYS

CAMSHAFT FOR INTERNAL COMBUSTION ENGINE VALVE GEAR
Original Filed May 3, 1965 9 Sheets-Sheet 6
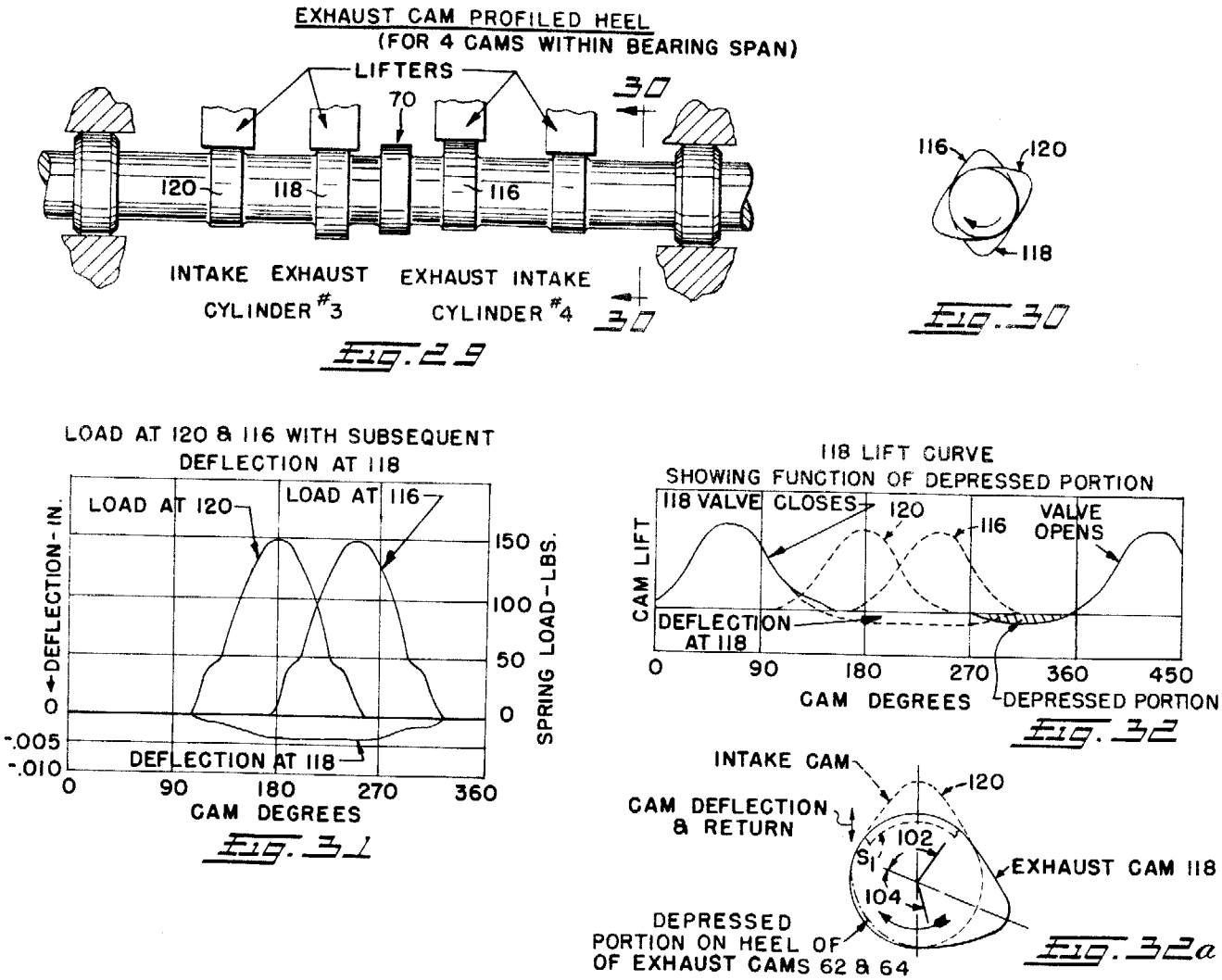
INVENTOR.
MICHAEL C. TURKISH
BY
Schramm, Kramer & Stenger
ATTORNEYS CAMSHAFT FOR INTERNAL COMBUSTION ENGINE VALVE GEAR
Original Filed May 3, 1965 9 Sheets-Sheet 7
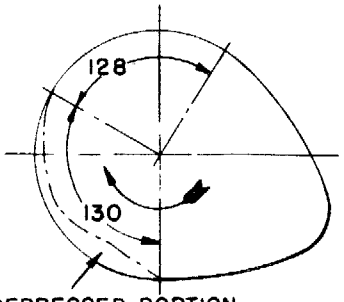
FIG. 3A
EXHAUST CAMS 122 & 124
FIG. 3B
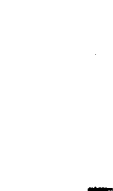
FIG. 3C
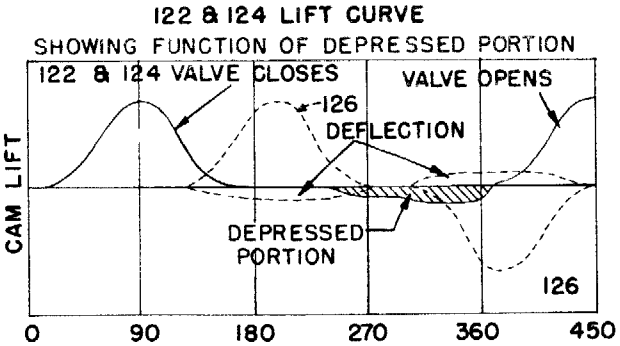
FIG. 3F
TYPICAL EXHAUST CAM PROFILED HEEL FOR ENGINES HAVING HORIZONTALLY OPPOSED CYLINDERS (FOR 3 CAMS WITHIN BEARING SPAN)
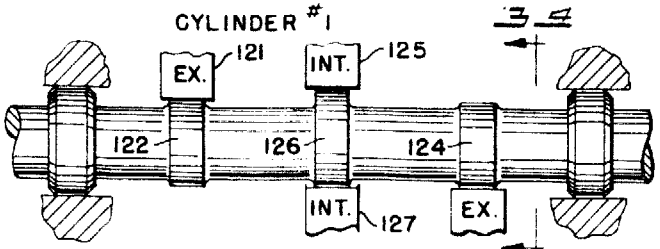
FIG. 3E
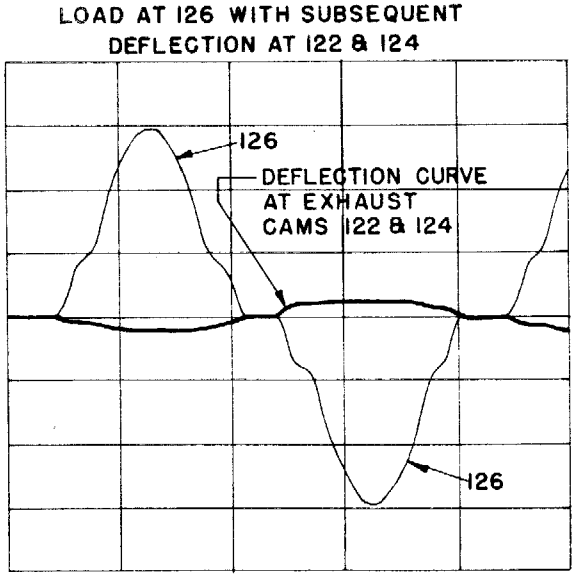
FIG. 3G
INVENTOR.
MICHAEL C. TURKISH
BY Schramm, Kramer & Stanger
ATTORNEYS

CAMSHAFT FOR INTERNAL COMBUSTION ENGINE VALVE GEAR

Original Filed May 3, 1965 9 Sheets-Sheet 8

TYPICAL INTAKE CAM PROFILED
HEEL FOR ENGINES HAVING
HORIZONTALLY OPPOSED CYLINDERS
(FOR 3 CAMS WITHIN BEARING SPAN)

INVENTOR.
MICHAEL C. TURKISH
BY
Schramm, Kramer & Stenger
ATTORNEYS

CAMSHAFT FOR INTERNAL COMBUSTION ENGINE VALVE GEAR

Original Filed May 3, 1965 9 Sheets-Sheet 9

INVENTOR.
MICHAEL C. TURKISH
BY Schramm, Kramer & Strauss
ATTORNEYS

United States Patent Office

Re. 26,353
Reissued Feb. 20, 1968

26,353
CAMSHAFT FOR INTERNAL COMBUSTION ENGINE VALVE GEAR

Michael C. Turkish, Lyndhurst, Ohio, assignor to Eaton Yale & Towne Inc., a corporation of Ohio Original No. 3,272,189, dated Sept. 13, 1966, Ser. No. 452,669, May 3, 1965. Application for reissue Nov. 1, 1966, Ser. No. 597,500
24 Claims. (Cl. 123—90)

Matter enclosed in heavy brackets [ ] appears in the original patent but forms no part of this reissue specification; matter printed in italics indicates the additions made by reissue.

*ABSTRACT OF THE DISCLOSURE*

*Valve gear for internal combustion engines in which valve gear loading produces valve gear deflections. A camshaft in combination with the valve gear is defined by a cam lobe and a heel having a developed profile in order to compensate for valve gear deflections. The cam heel comprises approximately one half of the total cam angle and is further defined by a portion of changed elevation located principally in one of the angular sectors of the cam heel.*

This invention relates to valve gear systems for internal combustion engines; and more particularly this invention relates to camshafts for internal combustion engines.

Still more particularly, the present invention relates to cam profiles that minimize valve forcing phenomena, thereby overcoming valve burning and valve seat sinking resulting from lifter compensations produced by camshaft deflections due to valve spring loadings on adjacent cam lobes.

The problem

In any internal combustion engine, precise valve openings and closings are necessary in order to provide proper engine performance and to maintain long valve life.

The valves must open and close at exact intervals, neither before nor after the proper instant. It is especially necessary that a valve, either exhaust or intake, not crack open prematurely or remain cracked open after the proper closing time. If this happens to an exhaust valve, it will quickly burn and its valve seat will sink as the hot burning gases sweep past to cause rapid deterioration of the precision mating faces on the valve and its seat, and also time for heat dissipation from the valve head to the valve seat is decreased. If this happens to an intake valve, it will cause idle roughness, impaired fuel economy, and diminished valve life because of the disturbance of the precise intake timing event.

Individual cams are provided in an internal combustion engine to impart the properly timed motion to the various intake and exhaust valves. These cams are made part of an integral camshaft structure which is provided with suitable journals for rotation in closely fitted bearings. The camshaft is geared to, and driven by the crankshaft to provide synchronous, and properly phased rotation at one-half crankshaft speed for four-cycle engines and at crankshaft speed for two-cycle engines.

Since engine performance characteristics are intrinsically dependent upon valve lift, event timing, event length, and shape of the lift curve, these factors are generally comprised to give the most desirable high speed performance and still retain reasonably good engine idling qualities. A cam lobe profile is designed to provide the proper valve lift motion with due consideration being given to the various parameters of lift, velocity and acceleration. Opening and closing ramps are also provided at the beginning and end of the cam lobe profile to open the valve without impact, and to seat the valves slowly to prevent bounce, and to eliminate valve seating noise.

The cam also includes a very important component in the form of a base circle. This has been treated by the prior art as a non-functional component which merely permits the valve to remain closed for an appropriate interval. Previously there has been no function in this portion of the cam to account for camshaft deflection.

In the prior art, this portion of the cam has been referred to as a base circle portion because it had a uniform radius throughout its length.

By employing a base circle, it is possible to add a self-compensating lifter to remove lash that normally appears in a valve gear under the conditions of a theoretically rigid camshaft. However, the self-compensating feature causes trouble when camshaft deflections enter the picture.

Camshaft deflections can produce interactions between adjacent valves and cause improper opening. As mentioned above, valve burning and valve seat sinking are the result on the exhaust side. Idle roughness and other malfunctions are the result on the intake side.

It is not economically feasible to produce an absolutely rigid camshaft construction that is free of deflections at all engine operating speeds. To do so would require a pair of journals for each cam; that is, one journal adjacent to each side of each cam. Economics and space limitations both are controlling factors. Even if it were possible to produce a rigid camshaft, valve gear bounce at high speed operation could still be encountered.

Accordingly, in production camshafts, it is common practice to position a plurality of cams between a pair of spaced bearing journals. A specific example is a typical production camshaft for an in-line six-cylinder engine having four cams between journals. Thus, two central cams are located side-by-side at mid-span between the two spaced bearing journals, and the two end cams are located adjacent to the bearing journals.

In this situation, the cams often produce mechanical interaction with one another as the result of camshaft deflections produced by valve spring loadings on adjacent cam lobes.

Particularly, in engines utilizing hydraulic valve lifters, improper valve closing has been encountered at both low and moderate engine speeds. The hydraulic lifter is employed in a valve gear system to remove automatically any existing lash appearing during the base circle interval. This normally serves to produce a lash-free system so that when the cam lobe rotates to the position of causing the valve to lift again, the valve immediately follows the cam lobe without any undue lag or impact. However, with the existence of mechanical interaction between adjacent cams, due to camshaft deflection, the phenomenon of hydraulic lifter fill-up causes undesirable compensation of the lifters. This results in the valves being forced just off of their seats during certain portions of their normal valve-closed intervals.

Undesirable hydraulic lifter compensation occurs during a part of the base circle interval, in instances where camshaft deflection results from the loading of adjacent cam lobes. Depending upon the angular relationship between the loaded cam lobe and the cam which has the hydraulic lifter on its base circle, some forcing of a particular valve from its seat may be experienced.

This problem is illustrated in FIGURES 1 and 3, wherein consideration is given to low and medium speeds of operation. Undesirable conditions occur when high load valve springs are used and when the camshaft has a measurable amount of flexure due to the high loadings caused by the valve springs.

Thus, as shown in FIGURES 1 and 3, a valve spring load imposed on the peak of one cam lobe (intake cam "I" for example) in its valve-open position produces a maximum deflection of that cam but this is not objectionable since that valve is open and the lifter is solidly loaded. However, this deflection is transmitted by the camshaft to an adjacent cam (exhaust cam "E" for example) which is in a valve-closed position. This causes the valve-closed position cam "E" to drop slightly, tending to move the base circle away from the face of the hydraulic lifter. The hydraulic lifter senses the clearance so produced, and fills up to compensate and remove the clearance. Thus, contact is maintained between the face of hydraulic lifter and the base circle of the cam "E."

This undesirable lifter compensation may occur during any part of the base circle period and will depend upon the instant of greatest camshaft deflection.

If the greatest amount of deflection occurs in the beginning part of the valve-closed base circle interval, undesired compensation will occur there, that is, just following the normal lift cycle. Then, however, in the latter part of the base circle interval, the deflection disappears, but the lifter remains undesirably compensated. This causes the valve to be forced open during the latter part of the base circle interval, or just prior to its normal lift cycle.

Similarly, if the greatest amount of deflection occurs in the latter part of the valve closed base circle interval, undesired liter compensation will occur there, that is, just prior to the normal valve lift cycle. Then, however, after the valve lift cycle is completed, the deflection disappears, but the lifter remains undesirably compensated. This causes the valve to be forced open during the early portion of the valve-closed base circle interval, or just after the valve lift cycle.

After a hydraulic lifter has compensated for the lash introduced between the lifter face and cam "E," FIG. 4, due to the deflection caused by loading of cam lobe, "I," it will remain filled, or undesirably compensated, upon further rotation of the camshaft when the pre-existing peak spring load on the first cam lobe "I" is relieved and the camshaft reverts from the deflected condition to the straight undeflected condition. Since the hydraulic lifter on the adjacent cam "E" has compensated, at the instant the camshaft reverts to the undeflected condition, it will force its valve, slightly lifting it off of its valve seat during a part of the base circle interval, thus producing engine malfunction.

The very limited amount of hydraulic lifter leakdown occurring during each cycle, when it is loaded on the lift portion of the cam lobe, is only one thousandth of an inch (.001) or less, and is therefore insufficient to offset the effect of hydraulic lifter compensation occuring when deflections exceed this amount. High rates of lifter leakage, by use of large clearances or low oil viscosities, will allow a greater tolerance to camshaft base circle deflections but this is not a satisfactory solution since it results in noisy and erratic valve seating.

Self-adjusting mechanical lifters operating with zero clearance are similarly sensitive to this problem of camshaft deflection. The same problems will also occur with these mechanical self-compensating devices as are encountered with hydraulic lifters where camshaft deflections cause valves to be improperly forced off of their seats.

Mechanical tappets, which have no self-adjusting means, and have a reasonably large appropriate clearance provided within the valve gear, are not so sensitive to this problem of camshaft deflection. Positive valve closing can be assured when the proper valve gear lash or clearance is provided. However, if the valve gear is designed to operate with very low lash, when using mechanical tappets, and the camshaft is capable of large deflections, in excess of the lash provided, then the forcing of the valves off their seats as encountered with hydraulic lifters, can occur.

Thus, at low and moderate speeds of engine operation, valve malfunctions are often produced by mechanical interactions of adjacent cams located between the same pair of journals. Spring loads imposed on the cam lobes are effective to deflect the camshaft and thus produce the cam base circle valve forcing phenomena, caused by lifter compensation occurirng during these deflections.

Therefore, a substantial and important advancement to the art would be provided by an improved cam profile that would counteract undesired hydraulic lifter compensation during the base circle interval to alleviate improper opening of valves of internal combustion engines using hydraulic lifters.

Further, an important advancement to the art would be provided by a novel cam profile that would counteract undesired lifter compensation produced by camshaft deflection, to alleviate improper opening of valves of internal combustion engines using self-adjusting mechanical or similar lifters.

Still further, an important advancement to the art would be provided by improved camshafts, operating with valve gear set to low clearances, that would alleviate improper opening of valves of internal combustion engines using mechanical tappets.

OBJECTS

It is therefore an important object of the present invention to provide improved valve gear for internal combustion engines.

It is a further object to provide improved camshafts for internal combustion engines.

A still further object is to provide improved cam profiles, that overcome malfunctions due to undesired hydraulic valve lifter compensation in instances of either camshaft or engine deflections.

A further object is to provide novel cam profiles and camshaft constructions wherein camshaft deflections are counteracted, to improve engine performance and to prolong valve and valve seat life.

A further object is to provide novel camshaft constructions that are operable to improve the performance of internal combustion engines using either hydraulic or mechanical self-adjusting lifters.

A further object is to provide unique cam profiles and camshaft constructions that improve the performance of internal combustion engines using fixed-lash mechanical tappets.

A still further object is to provide novel cam profiles that are operable to improve the performance of in-line piston engines, individual banks of multicylinder V-piston engines, and opposed-piston engines.

Other objects of this invention will appear in the following description and appended claims, reference being had to the accompanying drawings forming a part of this specification wherein like reference characters designate corresponding parts in the several views.

FIGURE 1 is a schematic elevational view of a portion of a camshaft having two cams located within a bearing span, to provide an environment for discussion of the problem that has been solved in accordance with the present invention;

FIGURE 2 is a schematic elevational view taken along line 2—2 of FIGURE 1;

FIGURE 3 is a schematic view taken as along line 3—3 of FIGURE 1;

FIGURE 5 is a view similar to FIGURE 1 but showing the camshaft in a partially rotated position beyond the FIGURE 1 position, where both valves now should be closed;

FIGURE 6 is a schematic view taken as along line 6—6 of FIGURE 5;

FIGURE 7 is a schematic view taken as along line 7—7 of FIGURE 5;

FIGURE 8 is a schematic view taken as along line 8—8 of FIGURE 5;

FIGURE 9 is a schematic elevational view, partly in section, of a portion of a camshaft wherein four cams are located within a bearing span, to provide an environment for discussion of the invention;

FIGURE 10 is a schematic end elevational view, taken as along line 10—10 of FIGURE 9, illustrating conventional cam profiles;

FIGURE 11 is a reproduction of an actual oscillogram of a load-time, or load-angle, diagram showing the presence of exhaust valve forcing while on the base circle, produced by the conventional cam profiles of FIGURE 10;

FIGURE 12 is a schematic view illustrating one aspect of the present invention;

FIGURE 13 is a reproduction of an actual oscillogram of a load-time, or load-angle, diagram showing the absence of exhaust valve forcing while on the novel functional heel resulting from use of the invention as shown in FIGURE 12;

FIGURE 14 is a composite oscillogram, made by superimposing the small circled portions of FIGURES 11 and 13, to illustrate more clearly the improvement obtained by use of the present invention;

Figures 15, 15A, 16, 17, 18, 19, 20:
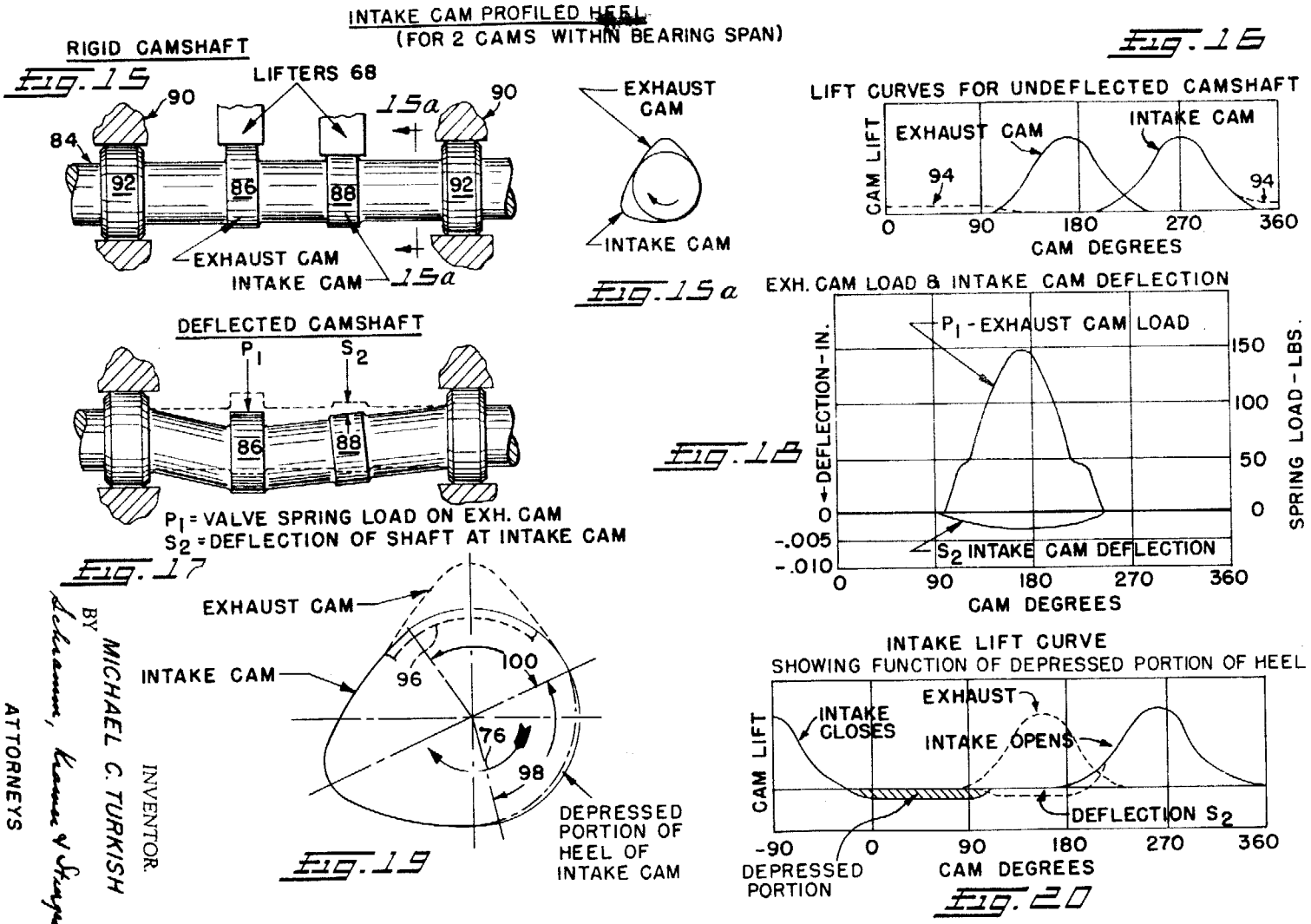
FIGURE 15 is an illustration of a segment of a theoretically rigid and undeflected camshaft having two cams within a bearing span, for purposes of further illustrating the problem.
FIGURE 15a is a schematic view taken along line 15a—15a of FIGURE 15.
Figure 21:
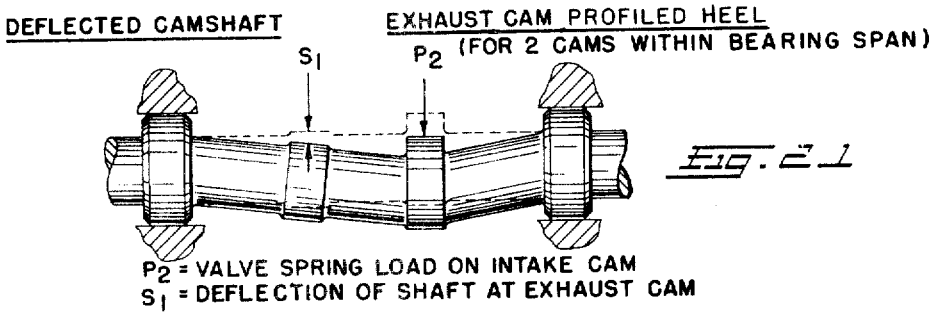
Figure 22:
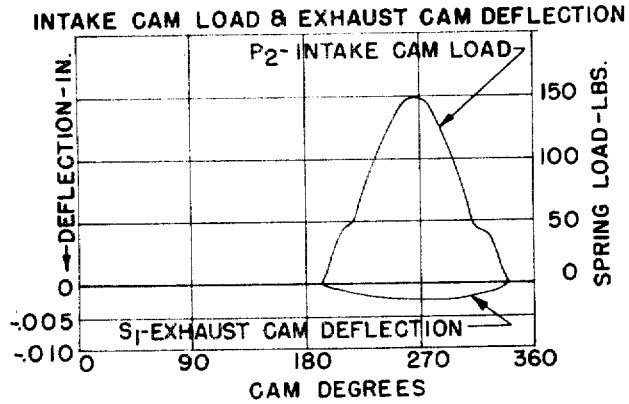
Figure 23:
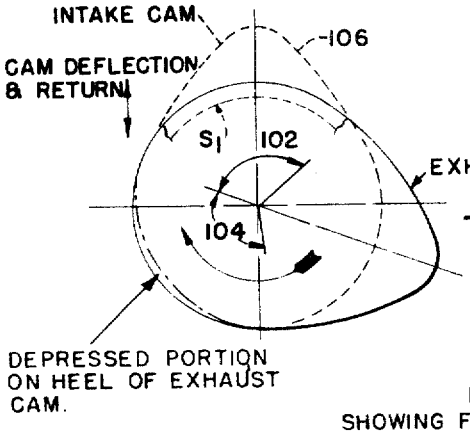
Figure 24:
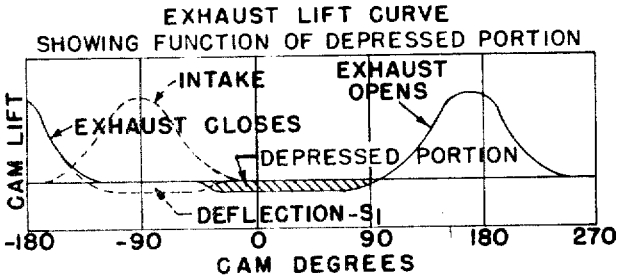
Figure 25:
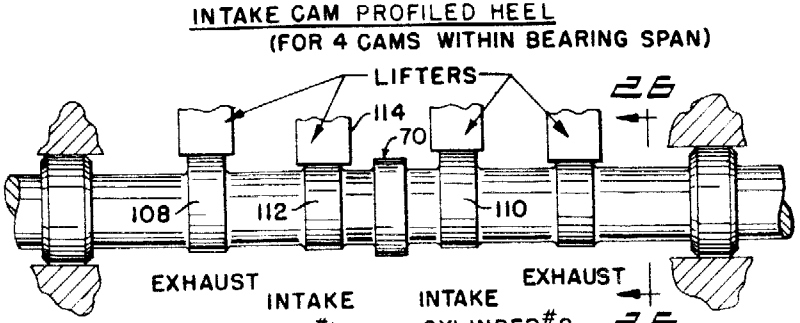
Figure 26:
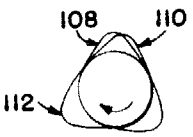
Figure 28:
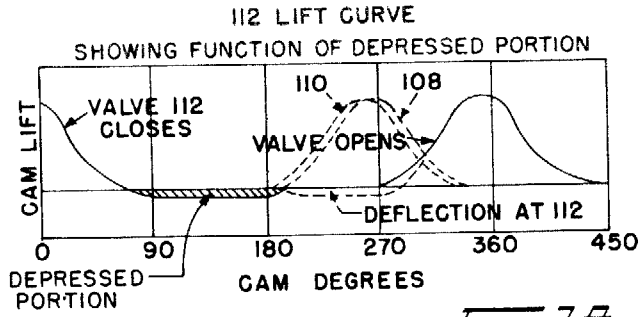
Figure 28A:
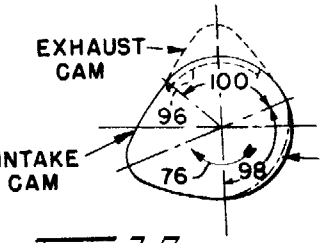
Figure 27:
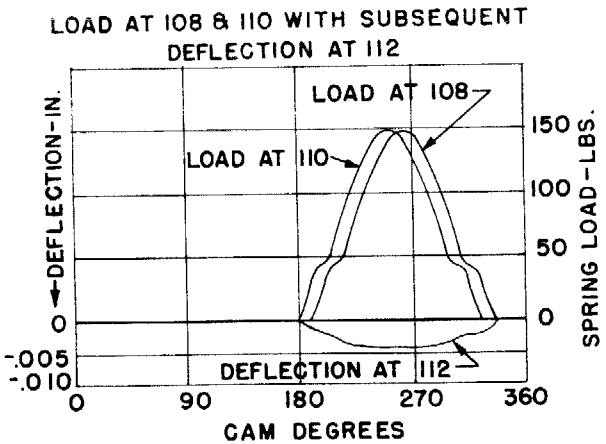
Figure 41:
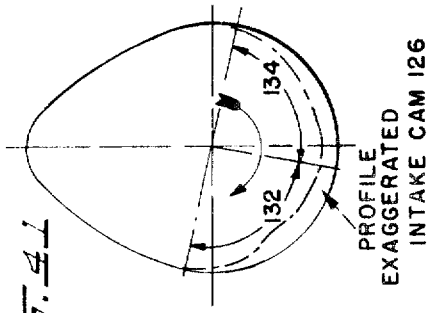
Figure 39:
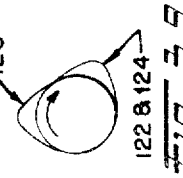
Figure 42:
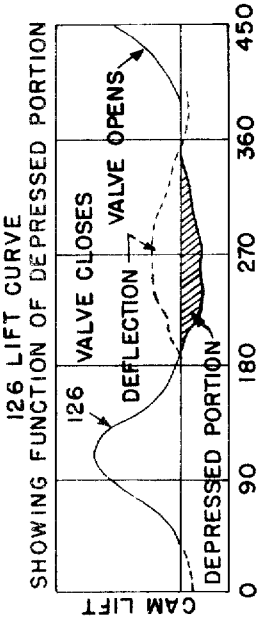
Figure 38:
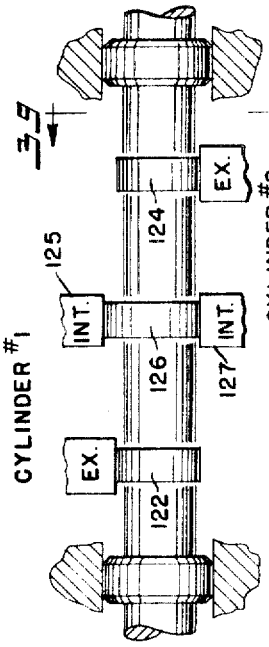
Figure 40:
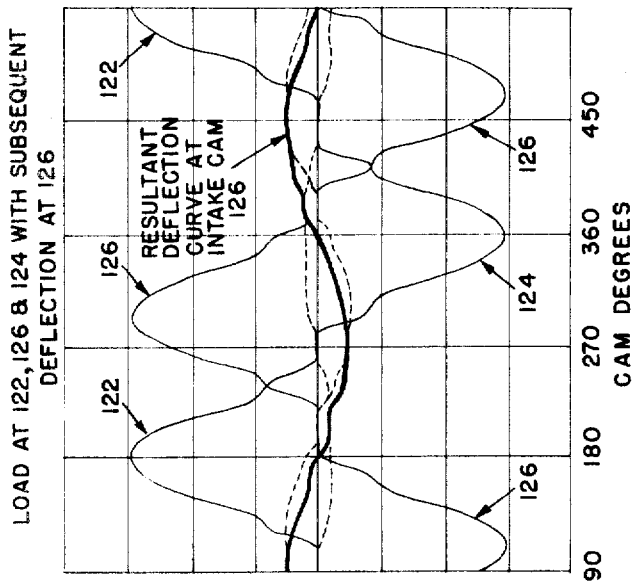

FIGURE 16 includes a graph illustrating normal lift curves for exhaust and intake cams of the undeflected camshaft of FIGURE 15, but with deflection shown by the dotted line;

FIGURE 17 illustrates the camshaft deflection encountered when two cams are located within a bearing span, wherein spring load on the exhaust cam lobe produces deflection of the intake cam;

FIGURE 18 is a graph showing intake cam deflection as related to exhaust cam lobe loading;

FIGURE 19 illustrates the principle of the present invention as applied to profiling the heel of the intake cam by depressing a portion of the heel in its early portion;

FIGURE 20 is a graph showing the function of the novel profiled heel of FIGURE 19 to prevent improper forcing of the intake valve off its seat as the result of camshaft deflection as illustrated in FIGURE 17;

FIGURE 21 illustrates the camshaft deflection encountered with two cams within a bearing span, wherein valve spring loading on the intake cam lobe produces deflection of the exhaust cam;

FIGURE 22 is a graph showing exhaust cam deflection as related to intake cam lobe loading;

FIGURE 23 illustrates the principle of the present invention as applied to profiling the heel of the exhaust cam by depressing a portion of the heel in its latter portion;

FIGURE 24 is a graph showing the function of the novel heel profile of FIGURE 23 to prevent improper forcing of the exhaust valve as the result of camshaft deflection illustrated in FIGURE 21;

FIGURE 25 is an illustration of four cams within a bearing span for purposes of showing the deflection of the intake cam of cylinder #1;

FIGURE 26 is a schematic view taken along line 26—26 of FIGURE 25;

FIGURE 27 is a graph showing deflection of the cylinder #1 intake cam of FIGURE 25, resulting from valve spring loading on the two adjacent cam lobes;

FIGURE 28 is a graph showing the function of profiling the heel of the intake cam of FIGURE 25 in accordance with FIGURE 28a, to prevent improper forcing of the intake valve by the heel as the result of camshaft deflection produced under the conditions of FIGURES 25 and 27;

FIGURE 28a is a reproduction of FIGURE 19 for convenient reference;

FIGURE 29 is an illustration of four cams within a bearing span, for purposes of showing deflection of the exhaust cam for cylinder #3; and, is a reproduction of FIGURE 9 for convenient reference, but is shown with the camshaft rotated into a different position;

FIGURE 30 is a schematic view taken along line 30—30 of FIGURE 29;

FIGURE 31 is a graph showing deflection of the exhaust cam of cylinder #3 in FIGURE 29, as the result of valve spring loadings on the two adjacent cam lobes;

FIGURE 32 is a graph showing the function of profiling the heel of the exhaust cam of cylinder #3 of FIGURE 29, in accordance with FIGURE 32a, to prevent improper forcing of the exhaust valve by the heel as the result of camshaft deflection produced under the conditions of FIGURES 29 and 31;

FIGURE 32a is a reproduction of FIGURE 23 for convenient reference relative to FIGURES 29–32;

FIGURE 33 is an illustration of three cams within a bearing span as used in an opposed-piston engine, for purposes of showing exhaust cam deflection;

FIGURE 34 is a schematic view taken along line 34—34 of FIGURE 33;

FIGURE 35 is a graph showing deflections of the two exhaust cams as the result of valve spring loadings on the intake cam lobes positioned therebetween, as in FIGURE 33;

FIGURE 36 illustrates the principle of the present invention as applied to profiling the heel of the exhaust cams of FIGURE 33;

FIGURE 37 is a graph showing the function of profiling the heels of both exhaust cams in FIGURE 33, in accordance with FIGURE 36, to prevent improper forcing of the exhaust valves of FIGURE 33;

FIGURE 38 is an illustration similar to FIGURE 33; of three cams within a bearing span as used in an opposed-piston engine, for purposes of showing opposed intake cam deflections;

FIGURE 39 is a schematic view taken along line 39—39 of FIGURE 38;

FIGURE 40 is a graph showing deflections of the intake came of FIGURE 38, as the result of valve spring loadings on the intake cam lobe and the two adjacent exhaust cam lobes;

FIGURE 41 illustrates the principle of the present invention as applied to profiling the heel of the intake cam of FIGURE 38;

FIGURE 42 is a graph showing the function of profiling the heel of the intake cam in accordance with FIGURE 41;

FIGURE 43 is a sectional view of a camshaft illustrating the profile of an exhaust cam wherein undesired lifter compensation is prevented in accordance with the principles of the present invention, by elevating a portion of the novel profiled heel above a theoretical base circle radius to provide a function equivalent to the previous showings wherein a portion of the heel was contoured to a level below a theoretical base circle periphery;

FIGURE 44 is a sectional view similar to FIGURE 43, but showing an adjacent intake cam profile, wherein undesired lifter compensation is prevented in accordance with the principles of the present invention, by elevating a portion of the novel profiled heel above a theoretical base circle radius, to provide a function equivalent to the previous showings wherein a portion of the heel was contoured to a level below a theoretical base circle periphery; and FIGURE 45 is a graph illustrating typical exhaust and intake cam lift curves produced by the novel profiled heel cams of FIGURES 43 and 44, for use with a deflected camshaft as encountered in actual engine operation.

Before explaining the present invention in detail it is to be understood that the invention is not limited in its application to the particular construction and arrangement of parts illustrated in the accompanying drawings, since the invention is capable of other embodiments and of being practiced and carried on in various ways.

Also, it is to be understood that the terminology employed herein is for the purpose of description and not of limitation. In particular, the terminology "profiling the heel" refers to providing a profile for the heel of the cam which is essentially non uniform radially as distinguished from a base circle of the prior art.

In one embodiment of the invention, this is effected by depressing selected regions of the heel to counteract camshaft deflections.

In an alternate embodiment, this profile can be described as elevating selected regions of the heel to counteract camshaft deflections.

In each case the precise end result of the profiled heel is the same. Therefore, the terminology "profiled heel" is adhered to and encompasses both of the foregoing embodiments.

Actually this invention was carried out by modifying existing cams having base circles of uniform radii, employing the first embodiment to prove the merits of the invention in actual engine tests. This shows that within the scope of the invention, profiled heels can be generated per se, or by undercutting conventional base circles in either the same or separate grinding operations.

Indeed, the present invention can be advantageously applied to a cam design by specifying the lift figures to five decimal places, as is the usual practice, for each degree of cam rotation throughout the entire 360 degrees. In this manner, both the heel profile and the entire cam lobe profile are specified as one continuous cam lift curve. In this manner all vagueness of terminology is eliminated and the true purpose of this invention can be precisely and systematically applied.

The problem reviewed; FIGURES 1–8

For purposes of illustrating the problem solved by the present invention, reference is first made to the simplified drawing of FIGURE 1. There, a segment of a camshaft is illustrated as having two cams within a bearing span. For this typical example the two cams are appropriately designated E and I for operating an exhaust valve and intake valve respectively. $P_2$ is the valve spring load on the intake cam lobe producing the deflection shown between the dotted and solid lines. The deflection is shown greatly exaggerated in order to better illustrate the problem. The dotted line would represent an undeflected camshaft and the solid line is the deflected position. $S_1$ is the deflection of the adjacent exhaust cam, transmitted by the deflected camshaft to the exhaust cam.

FIGURE 3 shows that the intake valve in FIGURE 1 is fully open. The deflection from the dotted to the solid line position of the intake cam is not harmful because the intake valve is intentionally open by the lobe of the cam.

Figure 4A:
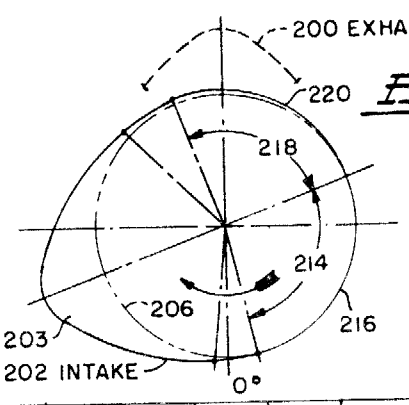
FIGURE 4 is a schematic view taken as along line 4—4 of FIGURE 1.
Figure 4B:
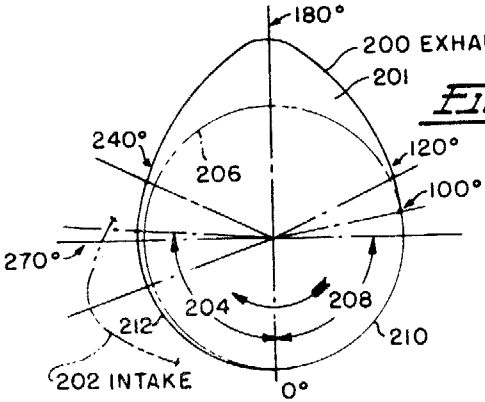
Figure 4C:
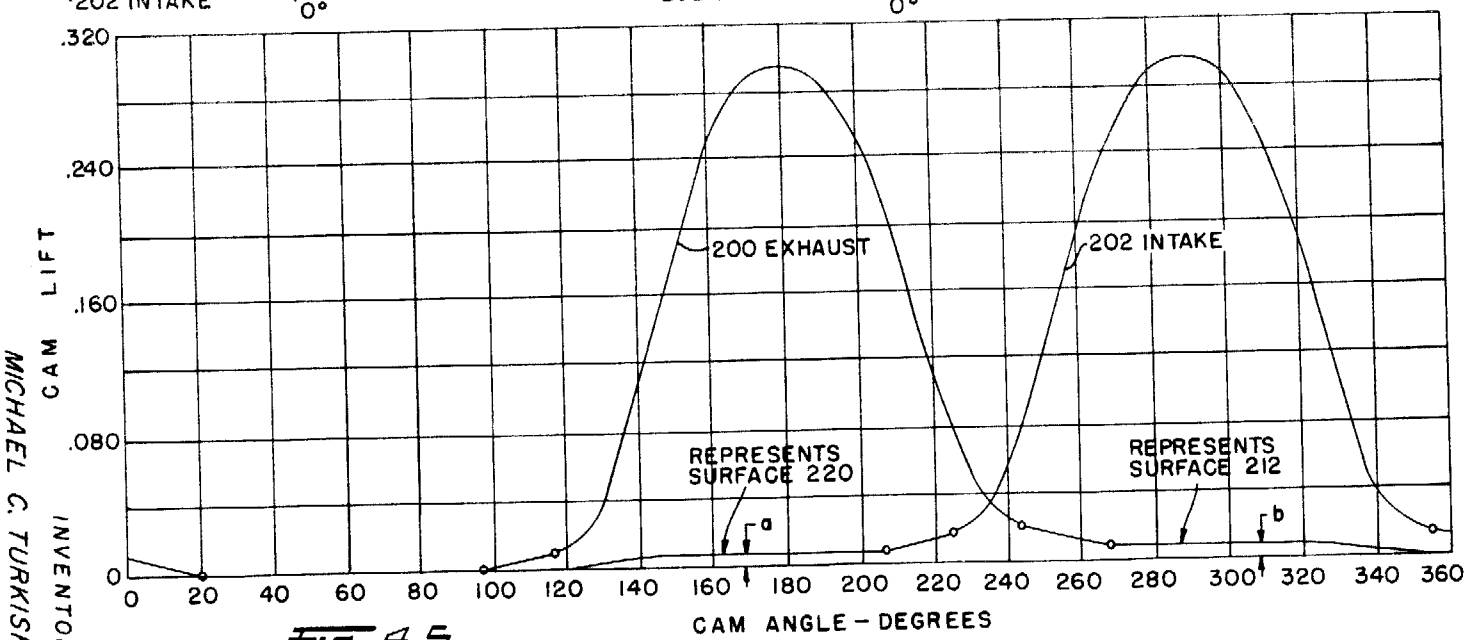

As shown in FIGURE 4, the exhaust cam is in a closed position and the exhaust valve is thus closed. The deflection $S_1$ at this instance imposes no harm to the exhaust valve, merely permitting the spring of the exhaust valve to hold it in a closed condition.

However, it will be noted that the lifter of the exhaust cam instantly, but undesirably compensates for the exhaust cam deflection $S_1$ and moves downwardly from the dotted line position to the extent shown. This is the precise point at which the trouble arises, as will be shown in the immediately following discussion.

In FIGURES 5 and 6, the camshaft has rotated clockwise by approximately 120 degrees to the position where both valves are theoretically closed. As shown in FIGURE 7, the intake valve is closed and the deflection has been removed as indicated by the absence of any dotted line, as in FIGURE 3.

However, as shown in FIGURE 8, the prior undesired lifter compensation $S_1$ is still present for the exhaust valve gear. This causes the exhaust valve to be slightly lifted off its seat as the lifter rides the base circle prior to the opening side of the cam lobe. At this position the exhaust valve should be fully closed instead of encountering the slightly open condition. This condition causes improper valve functioning.

The invention; a perspective view; FIGURES 9–14

In accordance with the present invention, instead of a base circle, a novel, profiled heel is employed.

Thus, lifter compensation which occurs during camshaft deflection is subsequently counteracted and as a result the valve is kept properly closed during the heel portion of cam operation.

In FIGURE 9 there is illustrated a portion of a camshaft 50. Bearings 52 and 54 support the camshaft at spaced intervals along its length, establishing the bearing span. The bearings 52 and 54 receive journals 56 and 58 respectively. Within the bearing span are four cams 60, 62, 64 and 66. Engaging each of the cams 60, 62, 64 and 66 are lifters 68.

The element 70 is a fuel pump eccentric frequently located centrally of a six-cylinder engine camshaft, as illustrated.

It is to be understood that the lifters 68 are each operably connected to a valve. The camshaft illustrated is actually used with an overhead-valve, six-cylinder engine. In this arrangement, each of the lifters 68 is operably connected to the bottom end of a pushrod that extends up along the side of the engine to engage one end of a rocker arm journaled on a rocker shaft, or pivot stud, bolted to the top side of the head of the engine. The other end of each rocker arm engages the end of a valve stem. Each valve stem in turn carries a valve spring, not shown, held captive between the top side of the engine head and a valve spring retaining washer attached to a groove on the valve stem. The valve spring thus is effective to continuously bias the valve toward a closed position, in turn forcing the rocket arm in a manner to force a lifter 68 downwardly to contact its cam, as shown in FIGURE 9.

It is to be kept in mind that the lifters 68 are self-adjusting hydraulic lifters and thus function to maintain constant contact with the cams so that there is no clearance or lash in the valve gear to produce noise, vibration and impact shock loads.

While the foregoing description has related to valve-in-head or overhead-valve engines, the same principle applies to valve-in-block engines.

In FIGURE 10 a conventional intake cam 60, for cylinder #3, is shown as having a true radius 72 as the base circle on the valve-closed portion of the cam. Typical of the prior art, this is non-functional. The cam also has a lobe 74. Typical of the prior art, this is the only functional portion. Also in FIGURE 10, there is shown a conventional exhaust cam 64, for cylinder #4. This also has a true base circle 72 and a lobe 75. The arrows 76 indicates the direction of rotation of the camshaft.

In the condition of FIGURE 10, which is the same as shown in FIGURE 9, the lobe 74 having spring-loaded lifter 68 on its peak, is that of the intake cam 60. In this condition, the intake valve of cylinder #3 is open. This imparts maximum spring load on the camshaft at that point and causes a downward camshaft deflection similar to that illustrated by FIGURE 1. This deflection at cam 60 is also imparted to the adjacent cam 62 which, in this instance, is the exhaust cam for cylinder #3.

Now visualize that the camshaft rotates as indicated by arrow 76. The lifter 68 rides down the lobe 74 in the arrow direction 78 so that the valve seats when the base circle 72 reaches the top side of the camshaft. The deflection caused by intake cam 60 decreases as the spring load is reduced, while the valve of cam 60 approaches its seat; and then the deflecting load source finally is eliminated as the valve becomes seated. Another source of deflection producing loading occurs as exhaust cam 64 operates its lifter and valve. In similar manner the valve spring load acting on cam 64 produces a downward deflection to the camshaft even after cam 60 rotates beyond the point where it causes no deflection. Now as lifter 68 rides down the lobe 75 of cam 64 the deflection caused by this cam decreases as the spring load is reduced. During this second unloading of the camshaft by cam 64 the camshaft returns toward its normal undeflected condition.

Now consider the action of cam 62 in FIGURE 10, which is adjacent to both cams 60 and 64.

If, in the angular sector 80 of the base circle, the cam 62 is deflected downwardly by valve spring loads on cams 60 and 64, as has just been explained, the lifter for cam 62 will undesirably compensate.

Then, as the angular sector 82 of the base circle is brought around to engaging position with the lifter face for cam 62, the previous compensation, being present at the instant when the camshaft deflection is relieved, causes forcing of the exhaust valve, being operated by cam 62, and the valve is cracked off its seat. This results in burning of the exhaust valve and sinking of the valve seat due to the leakage of the hot burning gases past the valve and valve seat.

FIGURE 11 is a reproduction of an actual oscillogram showing the presence of exhaust valve forcing by cam 62 of cylinder #3, as shown in FIGURES 9 and 10. This results from the sudden disappearance of the prior deflection when the lifter became filled up.

The invention applied

In accordance with the present invention, a novel profiled heel is employed. FIGURE 12 illustrates the manner in which the angular sector 82 of the heel is profiled by depressing its surface to the maximum depth 83 to nullify the forcing condition just described.

FIGURE 13 is a reproduction of an actual oscillogram taken during engine operation, using a novel profiled cam heel as illustrated in FIGURE 12.

FIGURE 14 more vividly illustrates how the base circle forcing problem has been solved in accordance with the present invention. The upper curve represents the forcing from FIGURE 11, the prior art, imposed upon a similar portion of the curve of FIGURE 13, representing the invention. The improvement of the invention is represented by a horizontal line, indicating the absence of exhaust valve forcing.

The foregoing description provides an illustration of the principle of the present invention and illustrates the manner in which the problems caused by camshaft deflections are overcome. Thus mechanical interaction of adjacent valves, produced by camshaft deflections caused by loads imposed by operating adjacent cam lobes, are counteracted by the invention.

As a follow-up to the foregoing, a complete description and further development of the principles involved will now be provided.

The intake cam profiled heel: FIGURES 15–20; two cams within bearing span

In FIGURE 15, there is shown a theoretically rigid camshaft. This is designated 84, and is illustrated as having two cams within the bearing span as distinguished from FIGURE 9, which had four cams. Here, the exhaust cam is designated 86 and the intake cam 88. The lifters are designated 68, as before. The spaced bearings are designated 90 and the journals 92.

FIGURE 16 includes a graph of the lift curves for an undeflected camshaft, as illustrated in FIGURE 15. As regards the exhaust cam, there is a positive rise from zero lift in approximately 70°, passing through a maximum slightly before 180° and then back to exactly zero at slightly before 270°. Similarly there is a uniformly smooth curve for the intake cam, showing positive rise from exactly zero lift at slightly after 180°, to a maximum at 270°, returning to exactly zero at approximately 360°. It will be observed that at no time during the closed period is there any indication of anything other than exactly zero lift. Thus the valves theoretically are tightly closed during the entire base circle interval.

It can be readily understood that if there was any forcing of the intake cam due to exhaust cam lobe loading and deflection, there would be a partial intake valve opening as indicated by the dotted line 94 in FIGURE 16.

This condition would result from the type of deflection shown in FIGURE 17.

Referring more particularly to FIGURE 17, there is a maximum valve spring load imposed on the exhaust cam 86. This produces a maximum deflection at this point. Also, it produces a deflection of the camshaft as far away as intake cam 88. This is shown graphically in FIGURE 18. Thus as shown in FIGURE 18, as the exhaust cam load rises to a maximum, the intake cam deflection similarly reaches a maximum returning to zero when the exhaust cam loading has passed.

In this instance this deflection has no effect on the exhaust valve, because it is in an open position. However, there is a damaging effect on the intake valve. Thus, by reference to FIGURE 17, it is to be understood that a hydraulic lifter 68 has sensed the deflection $S_2$ of intake cam 88. Under the conditions of FIGURE 17, therefore, the lifter fills up to re-establish contact with the cam 88.

Now refer to FIGURE 19. The intake cam is actually deflected down to the dotted line position 96. The camshaft rotates in the arrow direction 76 to bring the intake cam up to an opening position. The previous, undesired compensation which the lifter has made is not damaging at this instant as the valve opens, since it just tends to open the valve a little further than normal.

However, when the intake cam rotates further to the position where the angular sector 98 of the novel profiled heel is uppermost, the depressed portion as shown in FIGURE 19 is effective to counteract the compensation previously made by the lifter and thus permits the valve to fully close.

As the angular sector 100, having the elevated portion of the novel profiled heel comes around to the top side, camshaft deflection will again come into play, as by the adjacent cam 68 opening the exhaust valve, to keep the valve properly seated, with the previous compensation of the lifter still existing.

The function of the depressed portion of the profiled heel is illustrated graphically in FIGURE 20. The intake valve closing period occurs from −90° to near 0°. The depressed portion in the shaded area allows the intake valve to become properly seated even though the camshaft returns to its undeflected condition during this interval. Since the camshaft remains undeflected from between 0° and 90° of rotation it is necessary to depress the heel for this full interval to counteract the lifter compensation which occurred previously when the camshaft was deflected.

On further rotation, cam 86 actuates the exhaust valve, opening at between 90° and 180°, imposing a deflection to both the exhaust and intake cams. The exhaust opening lift and the resulting deflection are shown as dotted lines in FIGURE 20. The depressed portion on the intake cam heel has now been passed, and thus the lifter rides the elevated portion of the heel during the angular sector 100 in FIGURE 19. It is in this region that the deflection $S_2$, shown in FIGURE 17, causes the undesired lifter compensation to occur, so that on the next passing of the 0° to 90° angular sector 98, the depressed portion must again counteract lifter compensation.

Summary

To make sure that the reader clearly understands the problem and the solution offered by the invention, it is simply reiterated as follows: A camshaft deflection causes a hydraulic lifter, which is riding the cam heel, to fill up. Then, during the interval on the heel when the camshaft deflection is relieved the hydraulic lifter will exert a force upon a valve to unseat it. Thus, in accordance with the present invention, the heel is profiled by being depressed in the angular sector that is top side when the camshaft is undeflected so as to counteract the compensated condition of the lifter.

The exhaust cam profiled heel: FIGURES 21–24; two cams within bearing span

FIGURE 21 illustrates a deflected camshaft wherein the spring load is maximum on the intake cam lobe. This of course produces a maximum deflection of the intake cam, with some of that deflection being imparted to the exhaust cam as $S_1$.

By referring to FIGURE 22, the intake cam loading and exhaust cam deflection are correlated. When the intake cam load is at a maximum, the deflection is at a maximum. When there is no intake cam load, the exhaust cam deflection is zero.

In FIGURE 21, the intake cam is shown at maximum valve open position, causing maximum valve spring force to be applied to the intake cam. This imparts deflection $S_1$ to the exhaust cam as shown in FIGURE 23. This deflection is sensed by the hydraulic lifter for the exhaust cam when the exhaust cam has the angular sector 102 of the novel profiled heel of FIGURE 23 uppermost. As the angular sector 104 of the heel comes up, during camshaft rotation, the valve would normally be lifted off its seat as the deflection $S_1$ was relieved by the intake cam 106 passing beyond the range of the cam lobe contacting its lifter. In order to counteract lifter compensation occurring during deflection, a depressed portion is provided on the heel in the region nearest the opening side of the exhaust cam lobe. This depressed portion is located principally in the angular sector 104 as illustrated in FIGURE 23.

By referring to FIGURE 24 it will be noted that the exhaust cam closes between −180° and −90°. At −90°, the intake is fully open, imposing maximum spring load, and thus deflection $S_1$ on the exhaust cam. This causes the exhaust cam to move away from the face of its lifter and the lifter compensates. As the intake closes near 0°, the face of the previously compensated exhaust lifter then rides the depressed portion of the heel to nullify the absence of deflection and thus keep the exhaust valve from being forced and held at a partially open position. Thus, the exhaust valve is kept at zero lift until shortly after 90° where the valve opening properly starts again.

Summary

The previous description has pinpointed the problem and the manner in which it has been solved in accordance with the present invention.

The prior description has been directed to two cams within a bearing span in order to crisply illustrate the problem and highlight the application of the principles of the present invention thereto.

Additionally, the invention is applicable to a camshaft wherein four cams are included within a bearing span as was originally mentioned relative to FIGURE 9, representing the environment of a specific production six-cylinder engine. Problems of camshaft deflection become more complicated with a greater number of cams between bearing spans. Therefore, the following description will discuss in detail these problems and the manner in which they have been overcome by the present invention.

The intake cam profiled heel: FIGURES 25–28a; four cams within bearing span

Based upon the principles developed relative to FIGURES 15–20 application of the present invention to an intake cam in a production six-cylinder engine will now be described.

By reference to FIGURES 25 and 26, it will be noted that maximum valve spring load is imposed upon exhaust cam lobe 108 and intake cam lobe 110.

As shown in FIGURE 27, intake cam 112 is deflected by the double loading at cam lobes 108 and 110. In accordance with the principles previously laid down, the lifter 114 will undesirably compensate for the deflection indicated in FIGURE 27, for cam 112. Then, as the result of this compensation, there will be an intake valve malfunction when the camshaft rotates the intake cam 112 to a position where the camshaft deflection is removed by a removal of the spring loads from cam lobes 108 and 110, since the invention is not incorporated in the above descriptive action.

Now, in FIGURE 28, the function of the depressed portion of the heel in accordance with FIGURE 28a is portrayed. Beginning at the left, the valve 112 closes between zero and 90°. The depressed portion of the heel of the cam, just after valve closing nullifies the disappearance of the camshaft deflection during 90° to 180° of rotation.

At 180° to 270° rotation, valves 110 and 108 are open, imposing spring load deflection on the camshaft and causing intake cam 112 to deflect downwardly. The depressed portion has now passed and the lifter is riding on the elevated portion of the heel in angular sector 100 as shown in FIGURE 28a. The camshaft deflection which now exists, counteracts the previous compensation of the lifter, keeping the valve at zero lift while the lifter is riding the elevated portion of the heel. Then, at 270°, the intake valve 112 opens at the proper time so that no malfunction has occurred during its complete rotation due to the incorporation of the present invention.

The exhaust cam profiled heel: FIGURES 29–32a; four cams within bearing span Based upon the principles developed relative to FIGURES 21–24, application of the present invention to an exhaust cam in a production six-cylinder engine will now be described.

In FIGURE 29, maximum valve spring load is imposed on the lobe of exhaust cam 116 during the instant illustrated. The resulting deflection causes a deflection of the adjacent exhaust cam 118. Also, the intake cam lobe 120 imposes a load and deflection factor on cam 118, as illustrated in FIGURE 31 and as described in detail previously relative to FIGURES 9 and 10.

The manner in which the depressed portion of the profiled heel of the exhaust cam, in accordance with FIGURE 32a, functions in the situation of FIGURE 29 is shown graphically in FIGURE 32. The exhaust valve actuated by cam lobe 118 has a closing stroke between about 90° and 180°. The deflection caused by intake cam 120 begins to take effect near the end of the closing stroke of cam 118. As the cam for valve 118 passes through the region from a little before 180° to a little after 270°, the loading of cam lobes 120 and 116 produces a downward camshaft deflection causing the lifter for the exhaust valve actuated by cam 118 to compensate.

During the interval when intake valve 116 is closing (240° to 300°), the camshaft deflection is gradually relieved. The depressed portion indicated in FIGURE 32a during angular sector 104 nullifies this disappearance of the camshaft deflection and keeps the exhaust valve 118 closed, thereby avoiding forcing the exhaust valve open.

The exhaust cam profiled heel for opposed-piston engines: three cams within bearing span; FIGURES 33–37

The principles of the present invention are not only applicable to in-line piston engines, but they are also applicable to opposed-piston engines, such as used in aircraft and in some present-day rear engine automobiles.

In opposed-piston engine structures of this type it is frequently possible to permit one cam lobe to actuate two lifters located diametrically opposite each other. This eliminates the need of one cam lobe and produces a more compact engine arrangement. A portion of such a camshaft for operation with two opposed engine cylinders is shown in FIGURE 33. Three cams are provided between the bearing span, and in this arrangement it is to be noted that cams 122 and 124 each actuate only one lifter. However, the middle cam operates opposed lifters 125 and 127.

It is to be understood that the arrangement is illustrative, and opposed exhaust lifters operated by a single exhaust cam in the mid span, flanked by two intake cams is also within the scope of the invention.

In this arrangement, referring to FIGURE 33, it will be noted that the two exhaust cams 122 and 124 will be deflected by alternate and opposite spring loads imposed against intake cam 126.

The cam profiled heel in accordance with the present invention, to counteract these deflections, is illustrated in FIGURE 36. The depressed portion of the profiled heel starts after angular sector 128 and grows deeper in sector 130.

The manner in which the depressed portion functions is illustrated graphically in FIGURE 37. As a prelude to the explanation following, it is to be kept in mind that the deflection diagrammed in FIGURE 35 is first in one direction and then in a diametrically opposite direction.

During the angular interval between 90° and 180°, shown in FIGURE 37, the exhaust valve 122 of cylinder #1 gradually closes. At the end of this closing stroke, the spring load acting upon lifter 125 of intake cam 126 of cylinder #1 comes into play, imposing a camshaft deflection and thereby causing a compensation by the hydraulic lifter 121 of exhaust cam 122. At about 270°, where valve 126 closes, the camshaft deflection is relieved. This would normally tend to force exhaust valve 122 prematurely open. However, the depressed portion propitiously provided to the profiled heel of cam 122 in angular sector 130 comes into effect, as shown in FIGURE 36, thus keeping the exhaust valve 122 closed.

An unusual region exists between 270° and 360°, conforming to the latter part of sector 130. Here the deflection of exhaust cam 122 is reversed into the opposite direction by the action of an opposite spring force acting on cam 126 caused by opening the intake valve of cylinder #2. This, in effect, doubles the deflection at exhaust cam 122, and is the reason why the depressed portion becomes deeper near the latter part of angular sector 130 in FIGURE 36.

The opposite direction deflection imparted to the camshaft must be counteracted, else the valve will be forced open for this interval on the heel. It will be noted from FIGURE 37 that all deflections are counteracted by the depressed portion of FIGURE 36; therefore the valve 122 remains properly closed until 360° where the opening properly begins again. In like manner exhaust cam 124 requires a similar depressed portion on the heel as illustrated in FIGURES 36 and 37.

The intake cam profiled heel for opposed-piston engines: three cams within bearing span; FIGURES 38–42

The same camshaft section containing three cams within a bearing span, as in FIGURE 33, has been reproduced in FIGURE 38. Again in this arrangement, it is to be noted that cam lobes 122 and 124 each actuate only one lifter, whereas, the intake cam lobe 126 operates opposed lifters 125 and 127. A complex deflection of cam 126 is the result.

As shown in FIGURE 40, reading from left to right, opening of intake valve of cylinder #2 by cam 126 acting on lifter 127, imposes an upward camshaft deflection that is partially balanced by the opening of exhaust valve of cylinder #1 by cam lobe 122.

Later, the opening of the opposite intake valve of cylinder #1 by cam lobe 126 acting on lifter 125 imposes a downward deflection adding to the downward deflection caused by cam lobe 122. This is somewhat balanced by the subsequent opening of the exhaust valve of cylinder #2 by cam lobe 124. Finally, the re-opening of intake valve of cylinder #2 by cam lobe 126 adds to the upward deflection imposed by cam lobe 124.

The net result of the foregoing rather complex loading of the different cam lobes produces a resultant deflection curve at the intake cam 126, as indicated graphically in FIGURE 40.

The manner in which the heel of the intake cam is profiled in both sectors 132 and 134 is shown in FIGURE 41. The function of the profiled heel of FIGURE 41 is illustrated graphically in FIGURE 42.

The intake valve of cylinder #2 in FIGURE 38 closes at 180°. The profile of cam 126 for sector 132 illustrated in FIGURE 41, counteracts the effect of the initial deflection imposed from the opposite direction between 180° and 270° by the loading on cam lobe 122 and the later deflection caused by loading cam lobe 126 to open intake valve of cylinder #1. This keeps the intake valve of cylinder #2 at zero lift. The further deflection encountered by the overlap of exhaust cam lobe 122 with the intake cam lobe 126, both operating valves of cylinder #1, begins at about 270° as illustrated in FIGURES 40 and 42. This compound deflection is counteracted by the depressed portion of the profile in about the central part of the heel as shown in FIGURE 41. As the exhaust valve of cylinder #2 by cam lobe 124 then opens, the deflection is counteracted somewhat in the opposite direction so that the depressed portion returns to a more shallow level as the sector 134 progresses. Therefore, between 270° and slightly before 360°, the changing profile functions to keep the valve at zero lift.

A recap of the invention; FIGURES 43–45

In these figures of the drawings a logical extension of the invention to include relatively elevated profiled heel portions is shown. Thus, the broad principle is extended by providing a specific portion of a novel profiled cam heel of the present invention relatively higher, in elevation, than another portion of relatively lower elevation.

As developed hereinbefore, the relatively depressed portion of the novel profiled heel functions to counteract undesired, but existing lifter compensation when the lifter is riding on that portion of the novel profiled heel and camshaft deflection has been simultaneously removed.

In this logical extension of the invention, undesired lifter compensation is prevented by the expedient of a novel profiled cam heel portion that is relatively elevated to an extent equaling camshaft deflection. Thus, when camshaft deflection takes place, this elevated heel portion in effect retains the lifter in a condition equivalent to that provided by a theoretically rigid camshaft.

Thus, the undesired lifter compensation is prevented.

To develop this logical extension further, reference is made to FIGURES 43, 44 and 45.

FIGURE 43 represents an exhaust cam 200 in front of an intake cam 202, for illustrative purposes, it being assumed that there are these two cam lobes only within a bearing span. Although the novel profiled heel shown will differ somewhat from the heel profile for three or four lobes within a bearing span, and the manner in which the intake and exhaust cams are oriented in such a configuration, FIGURE 43 nevertheless depicts a typical mode of operation.

Relative to the exhaust cam 200, as shown in FIGURE 43, it will be noted that the quadrant 204 in the early portion of the profiled heel is elevated beyond the circle 206 representing a base circle as used in cams of the prior art. In the quadrant 208, which lies in the latter portion of the novel profiled heel of the exhaust cam 200, the operating surface 210, though relatively depressed compared to the relatively elevated surface 212 of the earlier quadrant 204, is substantially at the circle dimension 206.

It will be noted tht this is the converse of the embodiments shown hereinbefore wherein a functional portion was developed by depressing a portion below the periphery of the circle. Although the same function is produced in counteracting valve interactions from camshaft deflections, here lifter compensation is prevented rather than being nullified after it has taken place as in the foregoing embodiments.

To further develop this description, identifying numerals need to be applied to FIGURE 44. Thus, the intake cam 202 has a quadrant 214 in the early portion of the heel where the working surface 216 is at the circle line 206. In the latter portion quadrant 218, the working surface 220 is relatively elevated above the circle 206.

Note that the arrangement is the opposite of FIGURE 43.

In view of the foregoing, the function of the novel profiled heel for the exhaust cam 200 as well as the novel profiled heel of the intake cam 202 can now be developed by reference to FIGURE 45. Proceeding from left to right in FIGURE 45, it will be noted that the exhaust 200 starts to open between 100° and 120°. By reference to FIGURE 43, the correlatives are shown. Between 120° and 180° the lobe 201 causes the valve to open to a maximum extent. Between 180° and about 240° there is a maximum closing with the closing ramp being encountered a little beyond 240°. The closing terminates just short of 270°. Thereupon, the lifter will ride the functional surface 212, which will be uppermost in FIGURE 43 at this time for the remainder of the revolution.

The intake action

Retracing now to 120°, it will be noted that as the exhaust cam 200 proceeds to a maximum open position at 180°, camshaft deflection represented by spring loading reaches its maximum, beginning at 120° and becoming maximum at about 150°, and remaining so to about 200° where it is rapidly diminished because the lobe 201 passes and the novel profiled heel takes over.

Under maximum spring loading, and thus during camshaft deflection, the quadrant 218 of the intake cam 202, FIGURE 44, is uppermost, i.e. in contact with the lifter. Due to the elevated functional surface 220, camshaft deflection is counteracted and the lifter is not permitted to undesirably compensate, as in the prior embodiments of the invention. Then, in quadrant 214, after the lobe 201 of exhaust cam 200 has passed and maximum spring load and consequent deflection are removed, the lifter can ride the surface 216, FIGURE 44, which is at the circle 206 line, without causing the valve to be improperly forced open, because the lifter is "normal."

From the foregoing, it will be understood that the camshaft deflection increment is substantially equivalent to the elevation produced by working surface 220, FIGURE 44, as represented by increment elevation "a" in the FIGURE 45.

Continuing to read from left to right in FIGURE 45, it will be understood that the increment elevation "b," which is shown somewhat greater than "a" for purposes of illustration, will function in the same manner when the intake lobe 203 is in contact with the lifter, thus causing deflection of the camshaft when the functional surface 212 of quadrant 204 of exhaust cam 200 is in contact with its lifter.

The foregoing therefore presents a logical extension of the invention where undesired lifter compensations are prevented by elevating a portion of the novel profiled heel to an extent equal to camshaft deflections produced by valve interactions.

It is to be understood that this extension is applicable to the various engine ramifications discussed herein, including in-line, V, opposed piston, etc.

Summary

In accordance with the present invention, the effects of camshaft deflections producing mechanical interactions between adjacent valves have been nullified. A number of advantages accrue from the present invention. These come about by the fact that the present invention improves valve gear action at low and medium speeds so that a broader cam event can be provided to improve high speed performance. At the same time high vacuum at idling engine speeds is preserved.

Thus, it is possible to provide a broader cam event, namely; a wider lobe to a cam profile, to obtain improved high speed performance and to eliminate hydraulic lifter pump-up at high engine speeds.

The use of wider cam lobe profiles, made possible by the allowed increased valve event at top dead center, permits longer acceleration intervals for the intake and exhaust cams to give improved valve gear dynamics. This also gives improved engine breathing at high speeds of operation to produce a noticeable increase in engine output torque and horsepower.

Further, improved life of valves and valve seats is an important contribution by the present invention, to the prior art.

Further, it is to be emphasized that the present invention provides improvements to both in-line piston engines, multiple-cylinder V-piston engines, and opposed-piston engines.

The prior art discussed

In the prior art, more particularly issued U.S. Patent 2,050,766, there is a disclosure that instead of a true base circle on a cam, an eccentric curve is used. However, that eccentricity in no way compensates for camshaft deflection and is distinguishable from the present invention by the fact that it produces a gradual and symmetrical change at the central portion of the base circle of the cam.

Attention is directed to page 2, column 2, lines 25 and following of Patent 2,050,766. The eccentricity is disclosed for the purpose of permitting the lifter to relax during the greater portion of that period when the valve is on its seat. By relieving the force of engagement between the valve lifter and the base circle portion of the cam, it permits the lifter to adjust. The obvious purpose of this relief is to provide a definite lash (absence of contact).

In the reference, there is no disclosure of a profiled heel that is related to camshaft deflection and its magnitude. More particularly there is no disclosure of a depressed portion in a particular angular sector of the heel as related to camshaft deflection and its magnitude. Therefore, the novel profiled heel of the present invention is clearly distinguishable from the truly eccentric cam base circle disclosed by the art.

Indeed, if used with hydraulic valve lifters, the eccentric base circle disclosed by the reference would readily contribute to engine malfunctioning, and valve burning and breakage.

It is therefore submitted that there is a substantial advance provided to the art in accordance with the present invention by the principle of profiling the cam heel in a manner to counteract the effect of the deflection produced by loading on a cam lobe.

The invention is more particularly applicable to undesired hydraulic lifter compensation arising from camshaft deflections. However, the invention is also applicable to self-adjusting mechanical lifters, operating with zero clearance, which compensate as a result of camshaft deflections.

The invention is also applicable, to a degree, to malfunctions produced by camshaft deflections when using mechanical tappets intended to operate with a small amount of fixed lash. Thus if mechanical tappets are improperly adjusted with insufficient lash and if camshaft deflections are excessive, then mechanical interaction between adjacent cams may produce valve loading and opening during the normally closed interval.

What is claimed is:

1. In a valve gear for an internal combustion engine having a camshaft of a nature that valve spring load on one cam lobe of the camshaft produces deflection of the camshaft and deflection of an adjacent cam on it, thereby producing mechanical interaction between the valves controlled by said cams, a cam consisting of a lobe, providing valve lift, and a heel having a developed profile for valve closing, the heel comprising approximately ½ of the total cam angle, and consisting of angular sectors, and the developed profile of the heel including a portion of changed elevation, located principally in one of said angular sectors, of a magnitude to compensate for the deflection imposed on said cam during camshaft rotation, whereby the valve controlled by said cam remains properly closed when the deflection of said cam is applied and then relieved, with the valve in a closed position.

2. In a valve gear for an internal combustion engine having a camshaft of a nature that valve spring load on one cam lobe of the camshaft produces deflection of the camshaft and thus deflection of an adjacent cam thereby producing mechanical interaction between the valves controlled by said cams, a cam including a lobe and a heel, the lobe providing valve lift, and the heel producing valve closing, and a portion of said heel being profiled to a magnitude substantially equivalent to the deflection imposed on said cam during camshaft rotation, whereby the valve controlled by said cam remains properly closed when the deflection of said cam is applied and then relieved, with the valve in a closed position.

3. In a valve gear for an internal combustion engine having a camshaft of a nature that valve spring load on one cam lobe of the camshaft produces deflection of the camshaft and thus deflection of an adjacent cam thereby producing mechanical interaction between the valves controlled by said cams, a cam including a lobe and a heel; the lobe providing valve lift, and the heel providing valve closing, and said heel being profiled to include a portion of elevation magnitude and duration substantially equivalent to the deflection magnitude and duration imposed on said cam during camshaft rotation, whereby the valve controlled by said cam remains properly closed when the deflection of said cam is applied and then relieved, with the valve in a closed position.

4. In a valve gear for an internal combustion engine having a camshaft of a nature that valve spring load on one cam lobe produces deflection of the camshaft and thus of an adjacent cam thereby producing mechanical interaction between the valves controlled by said cams, a cam including a lobe and a heel, the lobe comprising the cam lift portion, and the heel comprising approximately one-half of the total cam angle, and including two angular sectors, a profiled portion located substantially in one of said angular sectors, of a variable elevation magnitude substantially equivalent to the deflection imposed on said cam, and said profiled portion being of a length substantially equivalent to that portion of the rotation of the heel of said cam in valve-closed position over which the deflection of the cam is relieved, whereby the valve controlled by said cam remains properly closed when the deflection imposed on the cam is applied and then relieved.

5. In a valve gear for an internal combustion engine having a camshaft of a nature that valve spring load on one cam lobe produces deflection of the camshaft and thus deflection of an adjacent cam thereby producing mechanical interaction between the valves controlled by said cams, a cam including a lobe and a heel, the lobe comprising the cam lift portion, and the heel including approximately one-half of the total cam angle, and comprising two angular sectors for the valve closed portion, a contoured surface located substantially in one of said angular sectors of a variable depth magnitude substantially equivalent to the deflection imposed on said cam, and said contoured surface being of a length substantially equivalent to that portion of the rotation of the base circle heel of said cam in valve-closed position over which the deflection of the cam is applied, whereby the valve controlled by said cam is not improperly forced open when the deflection imposed on the cam is applied and then relieved.

6. In a valve gear for an internal combustion engine having a camshaft of a nature that valve spring load on one cam lobe produces deflection of the camshaft and thus of an adjacent cam, thereby producing mechanical interaction between the valves controlled by said cams, the valve gear including a self-adjusting lifter that compensates for said deflection and holds said compensated condition for a sufficient interval during the closing cycle to improperly force a valve partially open when the deflection of its cam is relieved, a cam including a lobe for the purpose of opening and then closing a valve, and a heel portion for the purpose of keeping the valve closed and said heel being developed on a generally circular contour, and a portion of said heel being of depth and circumferential length magnitudes corresponding to the deflection imposed on said cam, to counteract undesired compensation by said lifter during camshaft deflection, whereby lifter compensation present during the valve closed portion of the cam cycle is prevented from partially forcing open the valve controlled by that lifter.

7. In a valve gear for an internal combustion engine, including a camshaft with an exhaust valve cam and an intake valve cam in side-by-side relationship, so that valve spring loads sequentially imposed on said cams are effective to deflect the camshaft and both cams and thus produce mechanical interaction of the valves controlled by said cams, the cams each including heels having angular segments adjacent to the opening and closing sides of the lobe, the improvement of a depressed portion in the segment adjacent to the opening side of the lobe of the exhaust cam to compensate for valve force imposed by camshaft deflection relief, during the interval when that segment of the heel of the exhaust cam is operable, and a depressed portion in the segment adjacent to the closing side of the lobe of the intake cam to compensate for valve force imposed by camshaft deflection relief, during the interval when that segment of the heel of the intake cam is operable.

8. In a valve gear for an internal combustion engine, including a camshaft having a plurality of cams between a bearing span, said cams having different lobe positions so that valves controlled by said cams open and close in sequence, and the camshaft is of a nature that valve spring loads sequentially imposed on adjacent cams are effective to produce deflections of the camshaft and cams and thus produce mechanical interaction between the valves controlled by said cams, the improvement of a profiled heel on each of the cams, each said heel including a depressed portion to compensate for valve force resulting from camshaft deflection removal during the interval when the undercut profile portion is operable and maintains the valve associated with that cam in a closed position.

9. In a valve gear for an internal combustion engine including a camshaft with four cams between a bearing span, arranged in the order exhaust-intake-intake-exhaust, and the cams having different lobe positions whereby valves controlled by said cams open and close in sequence, and wherein the camshaft is of a nature that valve spring loads imposed on adjacent cams are effective to produce deflections of the camshaft and thus of various adjacent cams and thus mechanical interaction between the valves controlled by said cams, the improvement of a profiled heel having a relatively depressed portion nearest to the opening side of each of the exhaust cam lobes to counteract forces produced by camshaft deflection relief during the interval when that portion of the heel is operable.

and a profiled heel having a relatively depressed portion nearest to the closing side of each of the intake cam lobes to counteract forces produced by camshaft deflection relief during the interval when that portion of the heel is operable, whereby the valves controlled by said cams are not improperly forced open when the deflection of a cam is relieved, with the valve controlled by that cam in a closed position, so that the valve is maintained positively closed.

10. In a valve gear for an internal combustion engine including a camshaft with four cams between a bearing span, arranged in the order exhaust-intake-intake-exhaust, and the cams having different lobe positions whereby valves controlled by said cams open and close in sequence, and wherein the camshaft is of a nature that valve spring loads imposed on adjacent cams are effective to produce deflections of the cam shaft and thus of various adjacent cams and thus mechanical interaction between the valves controlled by said cams, the improvement of a profiled heel having a relative depressed portion nearest to the closing side of each of the intake cam lobes to counteract forces produced by camshaft deflection relief during the interval when that portion of the heel is operable, whereby the valves controlled by said intake cams are not improperly forced open when the deflection of an intake cam is relieved, with the valve controlled by that cam being in a closed position, so that the valve is maintained in a properly closed position.

11. In a valve gear for an internal combustion engine, including a camshaft with four cams between a bearing span, arranged in the order intake-exhaust-exhaust-intake and the cams having different lobe positions whereby the valves controlled by said cams open and close in sequence, and wherein the camshaft is of a nature that valve spring loads imposed on adjacent cams are effective to produce deflections of the camshaft and thus of adjacent cams, the improvement of a profiled heel having a relatively depressed portion nearest to the opening side of each of the exhaust cam lobes to counteract forces produced by camshaft deflection relief during the interval when that portion of the heel is operable, and a profiled heel having a relatively depressed portion nearest to the closing side of each of the intake cam lobes to counteract forces produced by camshaft deflection relief during the interval when that portion of the heel is operable, whereby the valves controlled by said cams are not improperly forced open when the deflection of an individual cam is relieved, with the valve controlled by that cam in a closed position, so that the valves are maintained properly closed while the entire heel portion of the cam is operable.

12. In a valve gear for an internal combustion engine, including a camshaft with four cams between a bearing span, arranged in the order intake-exhaust-exhaust-intake, and the cams having different lobe positions whereby the valves controlled by said cams open and close in sequence, and where the camshaft is of a nature that valve spring loads imposed on lobes of adjacent cams are effective to produce deflections of the camshaft and thus of adjacent cams, the improvement of a profiled heel having a relatively depressed portion nearest to the opening side of each of the exhaust cam lobes to counteract force produced by camshaft deflection relief during the interval when that portion of the heel is operable, whereby the valves controlled by said cams are not improperly forced open when the deflection of a cam is relieved, with the valve operated by that cam in a closed position, so that the valve is maintained positively closed while the entire heel of the cam is operable.

13. In a valve gear for an opposed-piston engine including a camshaft with a plurality of cams between a bearing span, said cams having different lobe positions whereby the valves controlled by said cams open and close in sequence, and where the camshaft is of a nature that valve spring loads sequentially imposed on lobes of adjacent cams are effective to produce alternate bi-directional deflections of the camshaft and the cams, and thus produce mechanical interactions between the valves controlled by the cams, the improvement of a profiled heel for each cam, having a relatively depressed portion that is of varying depth along its circumferential length, to counteract forces imposed on the valve by camshaft deflection and by camshaft deflection reversal during the interval when the depressed portion of the heel is operable.

14. In a valve gear for an opposed-piston engine including a camshaft with three cams between a bearing span arranged in the order, single exhaust one side-opposed intake-single exhaust other side, and the cams having different lobe positions whereby the valves controlled by said cams open and close in sequence, and where the camshaft is of a nature that valve spring loads imposed on adjacent cams are effective to produce alternate bi-directional deflections of the camshaft and the cams, and thus produce mechanical interactions between valves controlled by the cams, the improvement of a profiled heel for each exhaust cam having a relatively depressed portion nearest to the opening side of the lobe, that is of varying depth along its circumferential length to counteract forces imposed on the valves by camshaft deflection and by camshaft deflection reversal during the interval when that portion of the heel is functioning to keep the exhaust valves closed.

15. The invention of claim 14 wherein the relatively depressed portion has a greater maximum depth nearest to the opening side of the cam lobe rather than the closing side of the lobe.

16. In a valve gear for an opposed-piston engine including a camshaft with three cams between a bearing span arranged in the order, single exhaust one side—opposed intake—single exhaust other side, and the cams having different lobe positions whereby the valves controlled by said cams open and close in sequence, and wherein the camshaft is of a nature that valve spring loads imposed on adjacent cams are effective to produce alternate, bi-directional deflections of the camshaft and the cams, and thus produce mechanical interactions between valves controlled by the cams, the improvement of a profiled heel for each intake cam having a relatively depressed portion nearest to the closing side of the lobe that is of varying depth along its circumferential length to counteract forces imposed on the valves by camshaft deflections and by camshaft deflection reversals during the interval when that portion of the heel is functional to keep the valve closed.

17. The invention of claim 16 wherein the relatively depressed portion has a greater maximum depth nearest to the closing side of the cam lobe rather than the opening side of the lobe.

18. In a valve gear for an opposed-piston engine including a camshaft with three cams between a bearing span arranged in the order, single exhaust one side-double opposed intake-single exhaust other side, and the cams having different lobe positions whereby the valves controlled by said cams open and close in sequence, and where the camshaft is of a nature that valve spring loads imposed on adjacent cams are effective to produce alternate bi-directional deflections of the camshaft and the cams and thus produce mechanical interactions between valves controlled by the cams, the improvement of a profiled heel for each exhaust cam having a relatively depressed portion nearest to the opening side of the lobe that is of varying depth along its circumferential length to counteract forces imposed on the valves by camshaft deflections in one direction and then into the opposite direction, during the interval when that portion of the heel is functional to keep the valve closed, and a profiled heel for each intake cam having a relatively depressed portion nearest to the closing side of the lobe that is of varying depth along its circumferential length to counteract forces imposed on the valves by camshaft deflections in one direction and then the opposite, during the interval when that portion of the heel is functional to keep the valve closed.

19. In a valve gear for an opposed-piston engine including a camshaft with three cams between a bearing span arranged in the order, single exhaust one side-double opposed intake-single exhaust other side, and the cams having different lobe positions whereby the valves controlled by said cams open and close in sequence, and wherein the camshaft is of a nature that valve spring loads imposed on adjacent cams are effective to produce alternate bi-directional deflections of the camshaft and the cams and thus produce mechanical interactions between valves controlled by the cams, the improvement of a profile heel for each exhaust cam having a relatively depressed portion nearest to the opening side of the lobe that is of varying depth along its circumferential length to counteract forces imposed on the valves by camshaft deflections in one direction and then the opposite during the interval when that portion of the heel is functional to keep the valve closed, said relatively depressed portion having a greater maximum depth nearest to the opening side of the cam lobe rather than the closing side of the lobe, a profiled heel for each intake cam having a relatively depressed portion that is of varying depth along its circumferential length to compensate for valve loading caused by camshaft deflection and then camshaft deflection reversal during the interval when that portion of the heel is functional to keep the valve closed, said relatively depressed portion having a greater maximum depth nearest to the closing side of the cam lobe rather than the opening side of the lobe.

*20. Valve gear for an internal combustion engine subject to engine deflections, and having valve gear components subject to valve gear loading which produces valve gear deflections, said valve gear including a camshaft, said camshaft comprising,*

*a cam consisting of a lobe, and a heel having a developed profile,*

*the heel comprising approximately one half of the total cam angle, and consisting of angular sectors,*

*and the developed profile of the heel including a portion of changed elevation, located principally in one of said angular sectors, said portion being so located and being of sufficient magnitude to nullify the effect of said deflections.*

*21. The invention of claim 20, wherein said portion of changed elevation has a variable magnitude along its length.*

*22. The invention of claim 20, wherein said portion of changed elevation is a relatively depressed portion, below the normal elevation of the cam heel.*

*23. The invention of claim 20 wherein said depressed portion has a variable depth magnitude along its length.*

*24. The invention of claim 20 wherein said portion of changed elevation is relatively higher than another portion of relatively lower elevation.*

References Cited

The following references, cited by the Examiner, are of record in the patented file of this patent or the original patent.

UNITED STATES PATENTS

| | | | |
|---|---|---|---|
| 1,365,735 | 1/1921 | Sherbondy. | |
| 1,543,438 | 6/1925 | Hutt | 123—90 |
| 2,050,766 | 8/1936 | Russell | 123—90 |
| 1,050,087 | 1/1913 | Steinbecker | 123—90 |
| 1,123,986 | 1/1915 | Bowman et al. | |
| 1,365,735 | 1/1921 | Sherbondy. | |
| 1,543,438 | 6/1925 | Hutt | 123—90 |
| 1,696,984 | 1/1929 | Trbojevich | 123—90 |
| 1,705,803 | 3/1929 | Brush et al. | 74—567 |
| 1,814,676 | 7/1931 | Estep | 123—90 X |
| 1,820,891 | 8/1931 | Spiller | 123—90 |
| 2,010,167 | 8/1935 | Tibbetts | 123—90 |
| 2,050,766 | 8/1936 | Russell | 123—90 |
| 2,947,296 | 8/1960 | Skinner | 123—90 |
| 2,999,491 | 9/1961 | Harkness | 123—182 |

AL LAWRENCE SMITH, *Primary Examiner.*